United States Patent
Liu

(10) Patent No.: US 12,452,397 B2
(45) Date of Patent: Oct. 21, 2025

(54) MULTIVIEW IMAGE CREATION SYSTEM AND METHOD

(71) Applicant: LEIA INC., Menlo Park, CA (US)

(72) Inventor: Sean Liu, San Francisco, CA (US)

(73) Assignee: LEIA SPV LLC, Menlo Park, CA (US)

( * ) Notice: Subject to any disclaimer, the term of this patent is extended or adjusted under 35 U.S.C. 154(b) by 44 days.

(21) Appl. No.: 18/239,691

(22) Filed: Aug. 29, 2023

(65) Prior Publication Data

US 2023/0412789 A1 Dec. 21, 2023

Related U.S. Application Data

(63) Continuation of application No. PCT/US2021/025687, filed on Apr. 4, 2021.

(51) Int. Cl.
*H04N 13/282* (2018.01)
*H04N 13/128* (2018.01)
(Continued)

(52) U.S. Cl.
CPC ......... *H04N 13/282* (2018.05); *H04N 13/128* (2018.05); *H04N 13/156* (2018.05);
(Continued)

(58) Field of Classification Search
CPC .... H04N 13/282; H04N 13/128; H04N 13/32; H04N 13/156
See application file for complete search history.

(56) References Cited

U.S. PATENT DOCUMENTS 6,417,850 B1 * 7/2002 Kang .................... G06T 15/205
345/422
8,146,277 B2 4/2012 Engel
(Continued)

FOREIGN PATENT DOCUMENTS

CA 3213167 10/2022
CN 111127538 A 5/2020
(Continued)

OTHER PUBLICATIONS

International Search Report and Written Opinion (ISRWO) by International Searching Authority (ISA) Korean Intellectual Property Office (KIPO) dated Dec. 24, 2021 (10 pages) for foreign counterpart parent International Application No. PCT/US2021/025687.

(Continued)

*Primary Examiner* — Zhubing Ren
(74) *Attorney, Agent, or Firm* — Schwegman, Lundberg & Woessner, P.A.

(57) ABSTRACT

A multiview image creation system and method create a multiview image from a single view image. Creating a multiview image includes importing a single view image and assigning the single view image to a first multiview image layer of a composite multiview image. Creating a multiview image further includes replicating the single view image into a plurality of view images of the first multiview image layer, converting a depth setting of the first multiview image layer into a plurality of shift values of corresponding view images based on an ordered number of the view images, and shifting the view images of the first multiview image layer according to the corresponding shift values. The plurality of multiview image layers may be automatically rendered in a predefined sequence as the composite multiview image on a multiview display.

20 Claims, 10 Drawing Sheets

(51) Int. Cl.
*H04N 13/156* (2018.01)
*H04N 13/32* (2018.01)
*H04N 13/349* (2018.01)
*H04N 13/359* (2018.01)

(52) U.S. Cl.
CPC ........... *H04N 13/32* (2018.05); *H04N 13/349* (2018.05); *H04N 13/359* (2018.05)

(56) References Cited

U.S. PATENT DOCUMENTS

| | | | |
|---|---|---|---|
| 8,970,582 | B2 | 3/2015 | An et al. |
| 9,123,176 | B2 | 9/2015 | Lu et al. |
| 2012/0170833 | A1 | 7/2012 | Kokojima et al. |
| 2013/0027389 | A1 | 1/2013 | Wang |
| 2014/0049611 | A1* | 2/2014 | Woo ............... H04N 23/635 348/222.1 |
| 2015/0130793 | A1* | 5/2015 | Han ............... H04N 13/128 345/419 |
| 2016/0014400 | A1* | 1/2016 | Han ............... H04N 13/349 348/59 |
| 2019/0052864 | A1* | 2/2019 | Xu ............... H04N 13/30 |
| 2020/0160055 | A1* | 5/2020 | Nakamura ............ G09B 29/10 |
| 2023/0030728 | A1 | 2/2023 | Dahlquist |

FOREIGN PATENT DOCUMENTS

| | | |
|---|---|---|
| JP | 2001167289 | 6/2001 |
| JP | 2013005376 | 1/2013 |
| JP | 2013017182 | 1/2013 |
| JP | 2013134787 | 7/2013 |
| JP | 2015022458 | 2/2015 |
| JP | 2021530181 | 11/2021 |
| JP | 2022530212 | 6/2022 |
| JP | 2024514534 | 4/2024 |
| KR | 20140033531 A | 3/2014 |
| KR | 20150055322 A | 5/2015 |
| KR | 20230145421 | 10/2023 |
| TW | 201218741 A | 5/2012 |
| TW | 201316751 | 4/2013 |
| TW | 201401224 | 1/2014 |
| TW | 202304199 | 1/2023 |
| TW | 1823323 | 11/2023 |
| WO | 2004036286 | 4/2004 |
| WO | 2020010183 | 1/2020 |
| WO | 2020219400 | 10/2020 |
| WO | 2022108609 A1 | 5/2022 |
| WO | 2022125128 A1 | 6/2022 |
| WO | 2022173611 A1 | 8/2022 |
| WO | 2022182368 A1 | 9/2022 |
| WO | 2022182369 A1 | 9/2022 |
| WO | 2022182376 A1 | 9/2022 |
| WO | 2023014576 A1 | 2/2023 |
| WO | 2023129214 A1 | 7/2023 |

OTHER PUBLICATIONS

Olivia Wiles, et al., "SynSin: End-to-end View Synthesis from a Single Image," arXiv: 1912.08804v2 [cs.CV], Apr. 18, 2020, pp. 1-22, from: <https://arxiv.org/abs/1912.08804>.

Tinghui Zhou et al., "Stereo Magnification: Learning view synthesis using multiplane images," arXiv: 1805.09817v1 [cs.CV], May 24, 2018, pp. 1-12, from: <https://arxiv.org/abs/1805.09817>.

Richard Tucker et al., "Single-View View Synthesis with Multiplane Images," arXiv: 2004.11364v1 [cs.CV], Apr. 23, 2020, pp. 1-10, from: <https://arxiv.org/abs/2004.11364>.

Wen-Nung Lie, "Chapter 5: View synthesis techniques," National Chung Cheng University (CCU), Taiwan, 2011, 51 pages, Internet document.

"Canadian Application Serial No. 3,213, 167, Voluntary Amendment filed Sep. 11, 2023", 51 pgs.

"Japanese Application Serial No. 2023-560964, Amendment filed Dec. 18, 2023", W English Claims, 27 pgs.

"Taiwanese Application Serial No. 111112833, Amendment filed Apr. 1, 2022", W English Claims, 55 pgs.

"Taiwanese Application Serial No. 111112833, Office Action mailed Mar. 15, 2023", W English Translation, 18 pgs.

"Taiwanese Application Serial No. 111112833, Response filed Jun. 12, 2023 to Office Action mailed Mar. 15, 2023", W O English Claims, 16 pgs.

"European Application Serial No. 21936198.7, Extended European Search Report mailed Dec. 16, 2024", 8 pgs.

"Canadian Application Serial No. 3,213,167, Office Action mailed Dec. 13, 2024", 3 pgs.

"Japanese Application Serial No. 2023-560964, Notification of Reasons for Rejection mailed Feb. 4, 2025", W English Translation, 14 pgs.

"Toshibas Technological Achievements in 2013", w English Translation, (Mar. 1, 2014), 5 pgs.

"Canadian Application Serial No. 3,213,167, Response filed to Apr. 14, 2025 Office Action mailed Dec. 13, 2024", 9 pgs.

Rehg, J M, "markVideo editing using figure tracking and image mark-markbased rendering mark", Image Processing, Proceedings. International Conference on Sep. 10-13, 2000, vol. 2,, [Online] Retrieved from the internet:https : bitsavers.org pdf dec tech_reports CRL-99 - 8.pdf, (Jan. 1, 2000), 26 pgs.

"European Application Serial No. 21936198.7, Response filed Jun. 25, 2025 to Extended European Search Report mailed Dec. 16, 2024", 19 pgs.

"Japanese Application Serial No. 2023-560964, Notification of Reasons for Refusal mailed Jul. 8, 2025", w English Translation, 10 pgs.

"Korean Application Serial No. 10-2023-7031127, Notice of Preliminary Rejection mailed Jul. 3, 2025", w English Translation, 13 pgs.

* cited by examiner

MULTIVIEW IMAGE CREATION SYSTEM AND METHOD

CROSS-REFERENCE TO RELATED APPLICATIONS

This patent application is a continuation patent application of and claims priority to International Patent Application No. PCT/US2021/025687, filed Apr. 4, 2021, the entire contents of which are incorporated by reference.

STATEMENT REGARDING FEDERALLY SPONSORED RESEARCH OR DEVELOPMENT

N/A

BACKGROUND

A multiview image represents a scene having different views. Views may overlap at varying degrees depending on the viewing angle. A viewer may perceive different views of a multiview image contemporaneously presented on a display as he or she is positioned at different viewing angles relative to the display. For example, different views of the multiview image are presented separately to each eye of the viewer to create a sense of depth. In some cases, viewers may wear special eyewear to control which views are perceived by the eye. In other cases, the views are directed to each eye in an autostereoscopic manner, without the need of special eyewear. In either case, a multiview display system renders multiview images for display. In some instances, multiview images are created using a camera (or multiple cameras) at different viewpoints to capture a scene. Each view is assembled together to form a multiview image.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
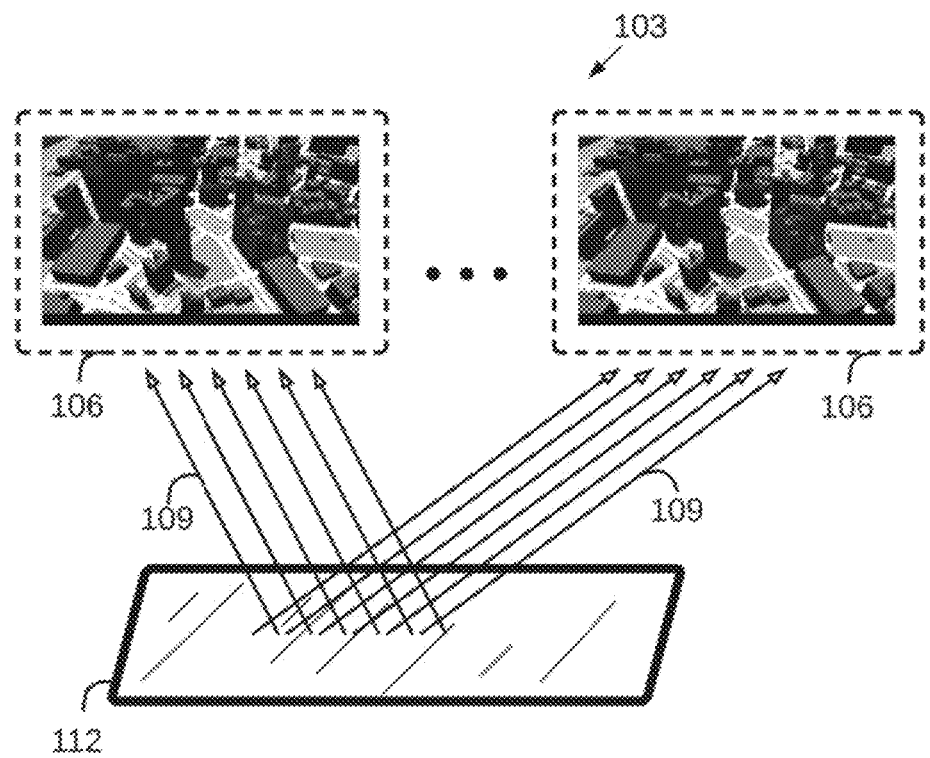
FIG. 1 illustrates a multiview image in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a solution to multiview image editing creation and editing. While multiview images may be created using a camera (or system of cameras) to capture images at different viewpoints of a scene, the embodiments, discussed herein, allow users to create multiview content by importing or otherwise creating a single view image, replicating the single view image to form a plurality of view images, modifying the depth by automatically shifting the different view images, and automatically rendering the result for display. Embodiments involve multiview image layers, where each multiview image layer contains the different view images that form the multiview image layer. Multiview image layers may be selected to so that various image editing operations are selectively applied to the selected multiview image layer. Such operations include, for example, modifying the depth of the content of the selected multiview image layer. Single view images may be imported in an application and associated with a new or a preexisting multiview image layer. The single view image may be replicated to generate multiples view images, which are copies of the single view image. A user may manipulate various depth settings to change the relative depth of the imported content. In response, the application converts the depth setting into shift values to shift the different view images proportional to the depth settings and the view positions (e.g., poses). By shifting pixels of different view images along a coordinate system, disparity is created among the different view images. This disparity is realized by the viewer as depth relative to the surface of the display. Thus, embodiments introduce the concept of a depth setting to selectively modify the characteristics of a single view image as it is converted into a multiview image.

In some embodiments, a depth map may be loaded and applied to a single view image to transform it into a multiview image that adopts the depth profile defined by the depth map. A depth map may be a pixel array (e.g., a bitmap) where each pixel value of a pixel represents a depth setting at the location of the pixel. Depth maps may then be applied to a single view image to allow the single view image to adopt depth characteristics of the depth map. For example, a depth map may define various shapes having depth (e.g., a convex, concave, cube, pyramid) and the depth map may be applied to a single view image, thereby transforming it into a multiview view. The depth map may be modified (e.g., stretched skewed, cropped) to conform to the shape and size of the objects represented by the single view image. A view synthesis may be performed to generate multiple view images from a modified depth map and a single view image.

FIG. 1 illustrates a multiview image in an example, according to an embodiment consistent with the principles described herein. The multiview image 103 has a plurality of views 106 (e.g., view images). Each of the views 106 corresponds to a different principle angular direction 109 (e.g., a left view, a right view, a center view, etc.). The views 106 are rendered for display by a multiview display 112. Each view 106 represents a different viewing angle or perspective of a scene represented by the multiview image 103. The different views 106 therefore have some level of disparity with respect to one another. A viewer may perceive one view 106 with her right eye while perceiving a different view 106 with her left eye. This allows a viewer to perceive different views 106 contemporaneously, thereby experiencing a three-dimensional (3D) effect.

In some embodiments, as the viewer physically changes her viewing angle with respect to the multiview display 112, the viewer's eyes may catch different views 106 of the multiview image 103. As a result, the viewer may interact with the multiview display 112 to see different views 106 of the multiview image 103. For example, as the viewer moves to the left, the viewer may see more of the left side of the scene in the multiview image 103. The multiview image 103 may have multiple views 106 along a horizontal plane and/or have multiple views 106 along the vertical plane. Thus, as a user changes the viewing angle to see different views 106, the viewer may gain additional visual details of the scene captured by the multiview image 103.

As discussed above, each view 106 is presented by the multiview display 112 at different, corresponding principal angular directions 109. Each view 106 corresponds to a beam of light (e.g., a collection of light rays having a similar principle angular direction 109). When presenting the multiview image 103 for display, the views 106 may actually appear on or in a vicinity of the multiview display 112. A characteristic of observing lightfield content is the ability to contemporaneously observe different views. Lightfield content contains visual imagery that may appear in front of the screen as well as behind the screen so as to convey a sense of depth to the viewer.

A 2D display may be substantially similar to the multiview display 112, except that the 2D display is generally configured to provide a single view (e.g., only one of the views) as opposed to the different views 106 of the multiview image 103. Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image (e.g., multiview frame) in or from different view directions contemporaneously from the user's perspective. In particular, the different views 106 may represent different perspective views of a multiview image 103.

The multiview display 112 may be implemented using a variety of technologies that accommodate the presentation of different image views so that they are perceived contemporaneously. One example of a multiview display is one that employs multibeam elements that scatter light to control the principle angular directions of the different views 106. According to some embodiments, the multiview display 112 may be a lightfield display, which is one that presents a plurality of light beams of different colors and different directions corresponding to different views. In some examples, the lightfield display is a so-called 'glasses free' three-dimensional (3-D) display that may use multibeam elements (e.g., diffractive gratings) to provide autostereoscopic representations of multiview images without the need to wear special eyewear to perceive depth.

Figure 2:
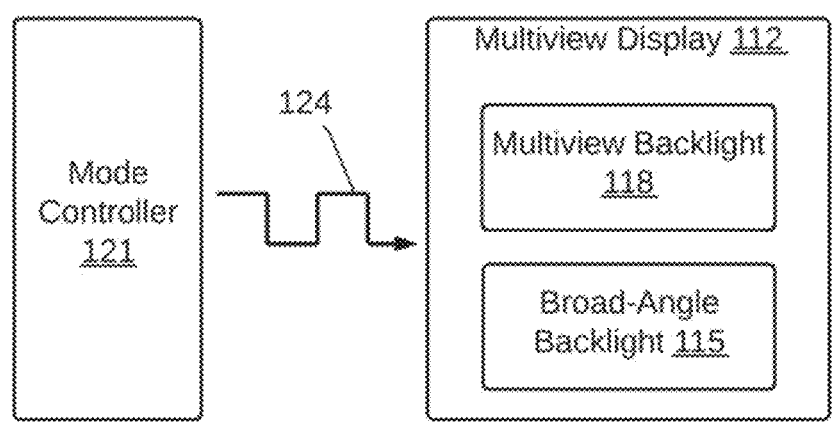
FIG. 2 illustrates an example of a multiview display, according to an embodiment consistent with the principles described herein.

FIG. 2 illustrates an example of a multiview display, according to an embodiment consistent with the principles described herein. A multiview display 112 may present a multiview image 103 when operating in a multiview mode. In some embodiments, the multiview display 112 renders multiview images as well as 2D images depending on its mode of operation. For example, the multiview display 112 may include a plurality of backlights to operate in different modes. The multiview display 112 may be configured to provide broad-angle emitted light during a 2D mode using a broad-angle backlight 115. In addition, the multiview display 112 may be configured to provide directional emitted light during a multiview mode using a multiview backlight 118 having an array of multibeam elements, the directional emitted light comprising a plurality of directional light beams provided by each multibeam element of the multibeam element array. In some embodiments, the multiview display 112 may be configured to time multiplex the 2D and multiview modes using a mode controller 121 to sequentially activate the broad-angle backlight 115 during a first sequential time interval corresponding to the 2D mode and the multiview backlight 118 during a second sequential time interval corresponding to the multiview mode. Directions of directional light beams of the directional light beam may correspond to different view directions of a multiview image 103. The mode controller 121 may generate a mode selection signal 124 to activate the broad-angle backlight 115 or multiview backlight 118.

In 2D mode, the broad-angle backlight 115 may be used to generate images so that the multiview display 112 operates like a 2D display. By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >±40°), or greater than about fifty degrees (e.g., >±50°). For example, the cone angle of the broad-angle emitted light may be greater than about sixty degrees (e.g., >±60°).

The multiview mode may use a multiview backlight 118 instead of a broad-angle backlight 115. The multiview backlight 118 may have an array of multibeam elements on a top or bottom surface that scatter light as plurality of directional light beams having principal angular directions that differ from one another. For example, if the multiview display 112 operates in a multiview mode to display a multiview image having four views, the multiview backlight 118 may scatter light into four directional light beams, each directional light beam corresponding to a different view. A mode controller 121 may sequentially switch between 2D mode and multiview mode so that a multiview image is displayed in a first sequential time interval using the multiview backlight and a 2D image is displayed in a second sequential time interval using the broad-angle backlight. The directional light beams may be at predetermined angles, where each directional light beam corresponds to a different view of the multiview image.

In some embodiments, each backlight of the multiview display 112 is configured to guide light in a light guide as guided light. Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide. The light guide may be shaped like a plate or slab. The light guide may be edge lit by a light source (e.g., light emitting device).

In some embodiments, the multiview backlight 118 of the multiview display 112 is configured to scatter out a portion of the guided light as the directional emitted light using multibeam elements of the multibeam element array, each multibeam element of the multibeam element array comprising one or more of a diffraction grating, a microrefractive element, and a micro-reflective element. In some embodiments, a diffraction grating of a multibeam element may comprise a plurality of individual sub-gratings. In some embodiments, a micro-reflective element is configured to reflectively couple or scatter out the guided light portion as the plurality of directional light beams. The micro-reflective element may have a reflective coating to control the way guided light is scattered. In some embodiments, the multibeam element comprises a micro-refractive element that is configured to couple or scatter out the guided light portion as the plurality of directional light beams by or using refraction (i.e., refractively scatter out the guided light portion).

The multiview display 112 may also include a light valve array positioned above the backlights (e.g., above the broad-angle backlight 115 and above the multiview backlight 118). The light valves of the light valve array may be, for example, liquid crystal light valves, electrophoretic light valves, light valves based on or employing electrowetting, or any combination thereof. When operating in 2D mode, the broad-angle backlight 115 emits light towards the light valve array. This light may be diffuse light emitted at a broad angle. Each light valve is controlled to achieve a particular pixel valve to display a 2D image as it is illuminated by light emitted by the broad-angle backlight 115. In this respect, each light valve corresponds to a single pixel. A single pixel, in this respect, may include different color pixels (e.g., red, green blue) that make up the single pixel cell (e.g., LCD cell).

When operating in multiview mode, the multiview backlight 118 emits directional light beams to illuminate the light valve array. Light valves may be grouped together to form a multiview pixel. For example, in a four-view multiview configuration, a multiview pixel may comprise for different pixels, each corresponding to a different view. In the case of a multiview pixel, each pixel in the multiview pixel may be referred to as a subpixel. Each subpixel in a multiview pixel may further comprise different color pixels.

Each light valve in a multiview pixel arrangement may be illuminated by its one of the light beams having a principle angular direction. Thus, a multiview pixel is a pixel grouping that provides different views of a pixel of a multiview image. In some embodiments, each multibeam element of the multiview backlight 118 is dedicated to a multiview pixel of the light valve array.

The multiview display 112 comprises a screen to display a multiview image 103. The screen may be a display screen of a telephone (e.g., mobile telephone, smart phone, etc.), a tablet computer, a laptop computer, a computer monitor of a desktop computer, a camera display, or an electronic display of substantially any other device, for example.

As used herein, 'disparity' is defined as the difference between at least two views of a multiview image at corresponding locations. For example, in the context of stereoscopic vision, the left eye and right eye may see the same object but at slightly different locations due to the difference in viewing angles between the eyes. This difference may be quantified as disparity. The change in disparity across the multiview image conveys a sense of depth.

As used herein, 'baseline' or 'camera baseline' is defined as the distance between two cameras that capture corresponding views of a multiview image. For example, in the context of stereoscopic vision, the baseline is the distance between the left eye and right eye. A larger baseline leads to increased disparity and may enhance the 3D effect of the multiview image.

As used herein, 'transparency' refers to an object property that defines the degree in which other objects behind an object may be seen. Increasing the transparency of an upper layer will allow lower layers to be seen. A minimum transparency (e.g., no transparency) will prevent a lower layer from being seen while a maximum transparency will make the particular layer invisible so as to completely reveal the lower layer.

As used herein, the article 'a' is intended to have its ordinary meaning in the patent arts, namely 'one or more'. For example, 'a processor' means one or more processors and as such, 'the processor' means 'the processor(s)' herein. Moreover, 'the memory' means 'one or more memory component(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
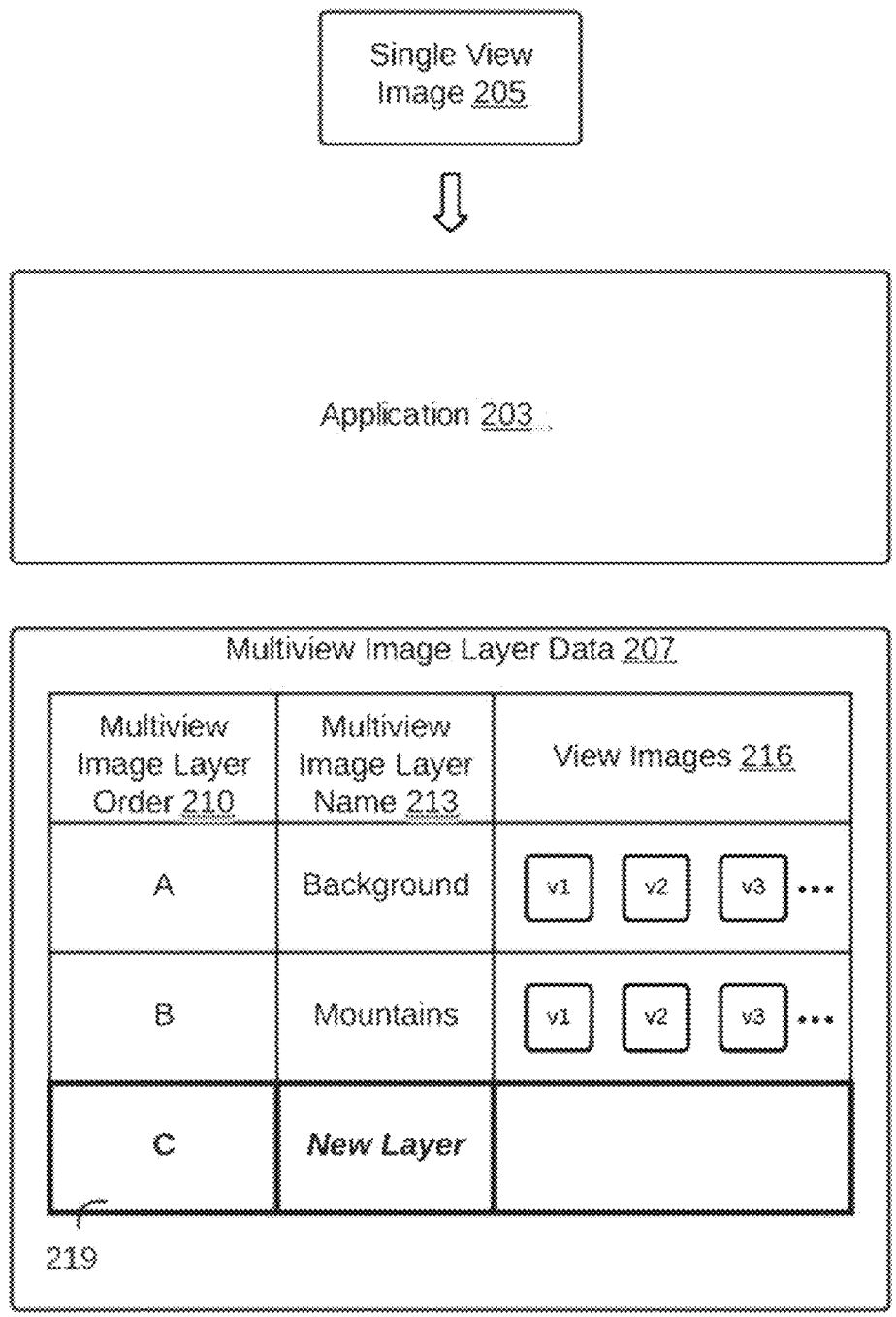
FIG. 3 illustrates an example of creating a multiview image from a single view image, according to an embodiment consistent with the principles described herein.

FIG. 3 illustrates an example of creating a multiview image from a single view image, according to an embodiment consistent with the principles described herein. FIG. 3 represents the functionality of a computing device or an application 203 that is executed by a computing device. In addition, FIG. 3 represents a computer-implemented method of creating a multiview image.

Figure 12:
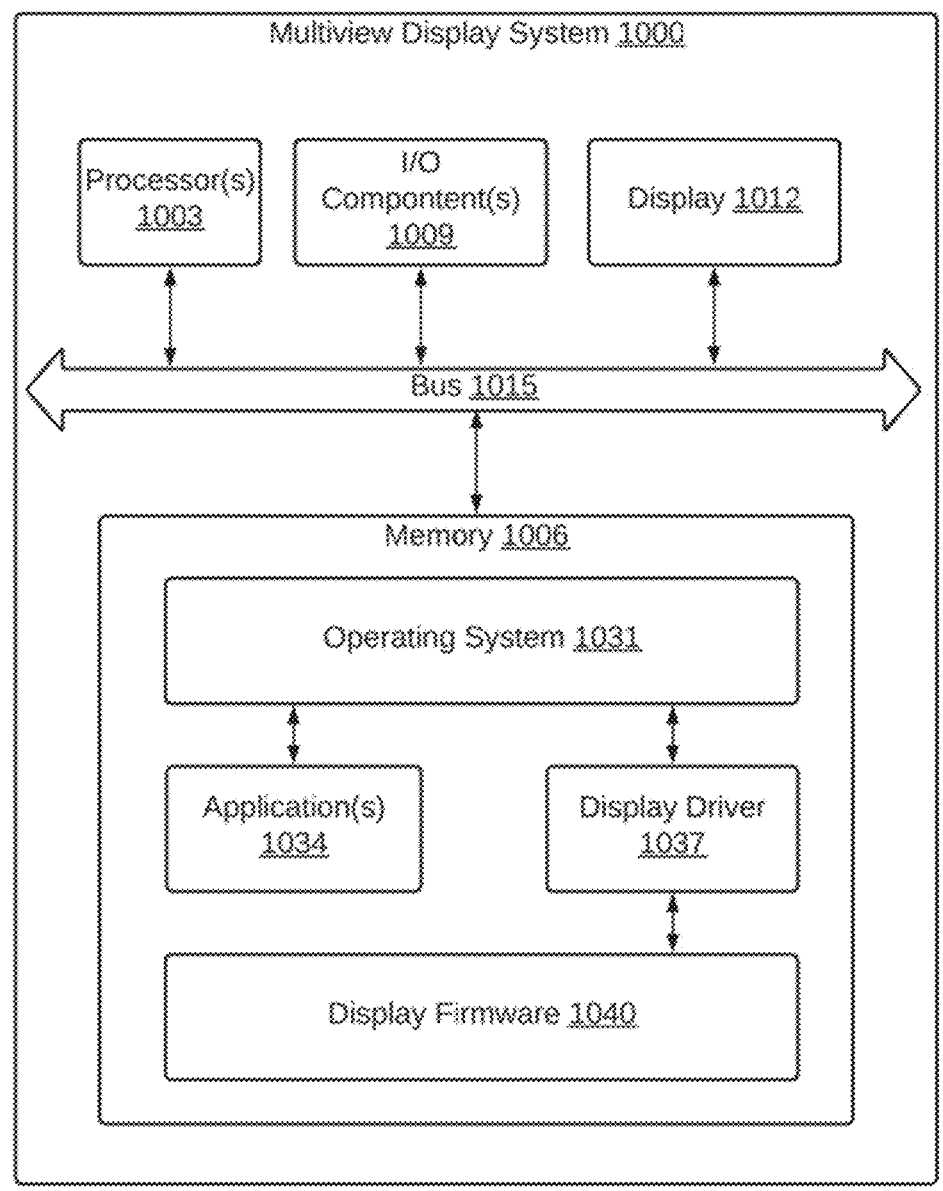
FIG. 12 illustrates a schematic block diagram that depicts one example illustration of a multiview display system according to an embodiment consistent with the principles described herein.

The application 203 may be a user-level application as discussed in further detail with respect to FIG. 12. The application 203 may provide a user interface to allow a user to create and edit multiview images such as, for example, the multiview image 103 of FIG. 1. The application 203 may perform various operations such as, for example, importing a single view image into the application 203, the single view image being assigned to a first multiview image layer among a plurality of multiview image layers that form a composite multiview image. The single view image 205 may be any 2D image and may be formatted in a bitmap format comprising color channel values and a transparency value for each pixel. For example, the single view image 205 may be an RBG image (red, green, blue) where each pixel has a red color value, a green color value, and a blue color value. In addition, the single view image 205 may have an alpha channel specifying a transparency value for each pixel.

The application 203 may allow a user to import the image by pasting the contents from a clipboard into the application. For example, an operating system may provide a clipboard or other system memory that temporarily stores copied image data. This data may be received by the application 203 through a paste operation. The application 203 may also allow a user to import the single view image 205 as an image file. The single view image 205 may also be imported into the application 203 by locally or remotely accessing a library of images.

The application 203 may manage multiview image layer data 207. For example, the multiview image layer data 207 may be generated by the application 203 and loaded in an address space in system memory. The multiview image layer data 207 may comprise a list of multiview image layers. The multiview image layers may be ordered according to a multiview image layer order 210 and identified by a multiview image layer name 213. Each multiview image layer contains a set of view images 216. Combining each multiview image layer together forms a composite multiview image that is ultimately rendered for display. Thus, the set of view images 216 for a given multiview image layer represents a layer of the composite multiview image. The single view image 205 may be assigned to a particular multiview image layer as it is imported into the application 203. For example, a user may select a multiview image layer before importing the single view image 205. Accordingly, the single view image 205 may be assigned to the selected multiview image layer as it is imported into the application 203. As another example, importing a single view image 205 may resulting in the application 203 creating a new multiview image layer, where the imported single view image 205 is then assigned to the newly created multiview image layer. Thus, the application 203 may create and select a multiview image layer or the user may select a pre-existing multiview image layer to which the imported single view image 205 is assigned.

The example of FIG. 3 depicts a plurality of multiview image layers that are stored as multiview image layer data 207. The user may name each multiview image layer by providing a multiview image layer name 213. In this example, there are three multiview image layers named "Background," "Mountains," "New Layer." Multiview image layers may be named to allow a user to track multiview image layers as the user creates multiview image content. New multiview image layers may be added and given a default multiview image layer name 213 such as, for example, "New Layer."

The multiview image layer order 210 defines a sequence in which the multiview image layers are to be rendered. Multiview image layers are rendered from bottom to top such that the bottom multiview image layer is painted first, intermediate multiview image layers are painted on top, and finally, the top multiview image layer is painted last. Thus, each multiview image layer may cover up the multiview image layers below it as the multiview image layers are rendered in sequence. In some embodiments, blending operations may be applied to blend layers together as they are being rendered for display. A user may change the sequence of the multiview image layer order 210.

When editing the multiview image, a user may operate on specific multiview image layers by selecting the multiview image layer. All image processing operations specified by the user may be limited to the selected multiview image layer. In the example of FIG. 3, "New Layer" is the selected multiview image layer, which may be referred to as a first multiview image layer 219. This allows a user to operate on select portions of the multiview image that is being created or otherwise edited. When importing a single view image 205, the single view image 205 may be assigned to the first multiview image layer 219 among the plurality of multiview image layers. In some embodiments, importing a single view image 205 automatically creates the first multiview image layer 219 such that the imported single view image 205 is assigned to a new multiview image layer. When sequentially rendering each multiview image layer, the result forms a composite multiview image.

Each multiview image layer contains its own set of view images 216. Each view image in the set of view images represents a different view like a view 106 of FIG. 1. Each view image has its own position relative to the other view image. The view images may be formatted in a variety of multiview configurations. A multiview configuration defines the number of view images. For example, a stereo multiview configuration has only a left view and a right view such that it is a two-view configuration. A four-view multiview configuration has four views, etc. In addition, the multiview configuration may also refer to the orientation of the views. Views may be orientated horizontally, vertically, or both. For example, a four-view multiview configuration may be oriented horizontally with four views across, may be oriented vertically with four views down, or may be oriented in a quad orientation with two views across and two views down. The application 203 may be configured to manage the views of each multiview image layer according to the multiview configuration. In some embodiments, a user may modify the multiview configuration by adjusting the number of views, the position of the views, the distance between the views (e.g., referred to as baseline), etc.

Figure 4:
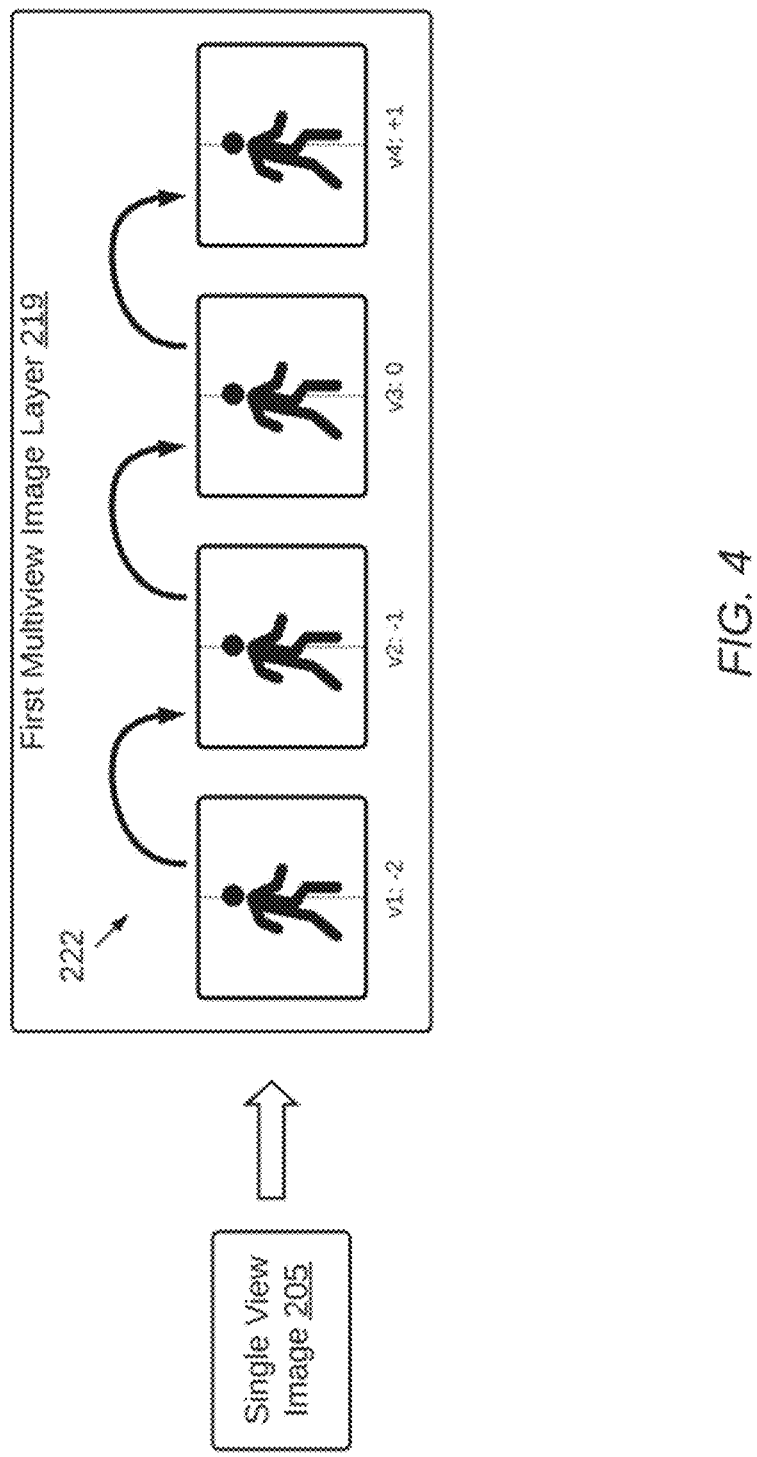
FIG. 4 illustrates an example of replicating a single view image to create a multiview image according to an embodiment consistent with the principles described herein.

FIG. 4 illustrates an example of replicating a single view image to create a multiview image according to an embodiment consistent with the principles described herein. For example, FIG. 4 depicts replicating the single view image 205 into a plurality of view images 222 of the first multiview image layer 219. The single view image 205 may be replicated automatically in response to importing the single view image 205. The first multiview image layer 219 may be previously selected or automatically generated in response to importing the single view image 205. FIG. 4, therefore, shows how the view images 222 are generated and assigned to the multiview image layer.

At least initially, each view image 222 may be replicas or copies of the single view image 205 such that there is no disparity between each view image 222. The single view image 205, in this example, is an image of a person walking (e.g., an object). A vertical dashed line is added in each view image 222 to show the location of the object positioned within the view image 222.

The single view image 205 may be replicated according to a multiview configuration that specifies the number of views as well as the view angles or positions. Each view may have an ordered number, which is a view index. In this example, view 1 (v1) has the number 1, view 2 (v2) has the number 2, view 3 (v3) has the number 3, and view 4 (v4) has the number 4. Each ordered number may correspond to a relative position of the view. In this example, v3 is considered the base view or center view. The left-most view, v1 is 2 units of distance to the left of v3, v2 is 1 unit distance to the left of v3, and v4 is 1 unit of distance to the right of v3. Thus, embodiments are directed to assigning one of the view images (e.g., v3) as a base view image. As explained below depth-based operations are made to the view images in a manner that is relative to the base view image.

Figure 5:
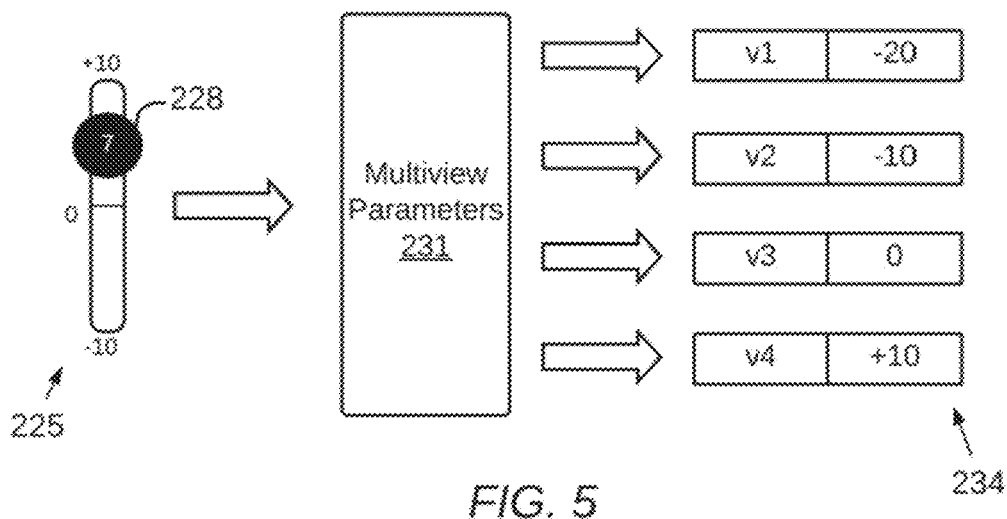
FIG. 5 illustrates an example of converting a depth setting to a plurality of shift values, according to an embodiment consistent with the principles described herein.

FIG. 5 illustrates an example of converting a depth setting to a plurality of shift values, according to an embodiment consistent with the principles described herein. FIG. 5 illustrates receiving user input comprising a depth setting for the first multiview image layer. The application 203 may provide a user interface for editing multiview image content. The user interface may include user interface element 225 that allows a user to specify a depth setting 228 for the first multiview image layer 219. The user interface element 225 may be a slider, dial, text box, or any other element that allows a user to specify a depth setting 228. The depth setting may be a value that corresponds to where rendered content will be perceived relative to the multiview display. For example, a depth value of zero indicates that the multiview content will appear at a depth equal to the screen (e.g., on the screen). In this example, positive values correspond to a depth that is in front of the screen while negative values correspond to a depth that is behind the screen. In the example of FIG. 5, the user selected a depth setting 228 of seven so as to effectively move a rendering of the single view image closer to the viewer (appearing in front of the screen at a particular distance). The depth setting 228 may apply only to the content associated with the selected multiview image layer(s).

FIG. 5 further shows operations of converting the depth setting to a plurality of shift values for corresponding view images based on an ordered number of each of the view images. For example, FIG. 5 shows how a depth setting 228 of seven is converted into shift values 234 for the four view images 222, where v1 has a shift value of −20, v2 has a shift value of −10, v3 has a shift value of 0, and v4 has a shift value of +10. The shift values may represent a shift distance relative to the base view image (e.g., v3). The sign of the shift value 234 may correspond to the direction of the shift (e.g., left or right). Thus, v1 is a replica of v3 that is then shifted by 20 pixels to the left.

FIG. 5 also shows assigning one of the view images as a base view image, wherein the shift value 234 of the base view image is zero. In this respect, the base view image (e.g., v3) remains static as the other view images are shifted relative to v3. As a user edits the content of the first multiview image layer 219, the same edits are automatically applied to all views within the first multiview image layer 219. However, the views remain shifted with respect to one another. For example, as a user performs image editing operations on a base view image, the image editing operations are automatically applied to the other views within the multiview image layer.

When converting the depth setting 228 to shift values 234, the application may account for the ordered view number. The ordered number corresponds to the position of the views and in turn, the distance between views. For example, v1 is farther away to v3 than it is to v2. Various multiview parameters 231 may control how to convert a depth setting 228 to a shift value 234. One example is a baseline. The baseline refers to the distance between two cameras (e.g., virtual cameras) that capture corresponding views of a multiview image.

Figure 6:
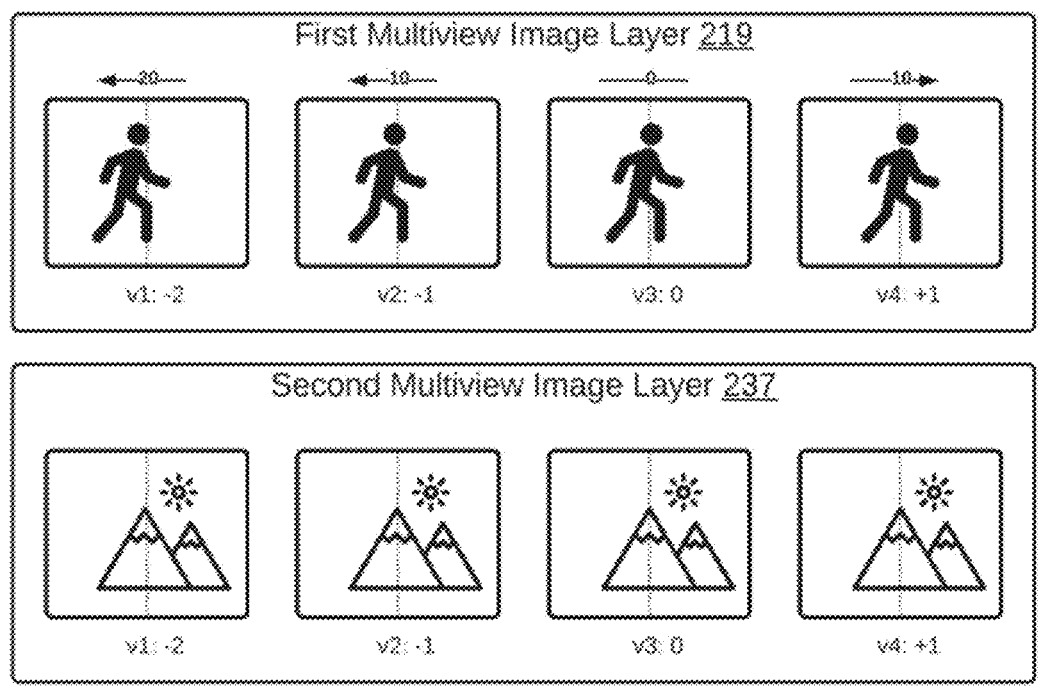
FIG. 6 illustrates an example of shifting view images to modify the perceived depth a multiview image, according to an embodiment consistent with the principles described herein.

FIG. 6 illustrates an example of shifting view images to modify the perceived depth a multiview image, according to an embodiment consistent with the principles described herein. FIG. 6 shows, shifting the view images of the first multiview image layer according to the corresponding shift values in response to the first multiview image layer being selected. For example, the first multiview image layer 219 may have the single view image 205 that was imported and replicated to create four different view images. There may be other multiview image layers such as, for example, the second multiview image layer 237. However, the replicated four view images are assigned solely to the first multiview image layer 219. The application of the depth setting 228 is selectively applied to the first multiview image layer 219. A user may control the relative depths between different objects of respective multiview image layers as he or she is creating new multiview image content.

The content of the first multiview image layer 219 is shifted by 20 pixels to the left in v1, 10 pixels to the left in v2, not shifted in v3, and shifted 10 pixels to the right in v4. The content in the second multiview image layer 237 remains the same throughout these shift operations. When rendered, this shifting affects the amount of relative depth between the content of the first multiview image layer 219 and the content of the second multiview image layer 237.

The example of FIG. 6 shows that shifting each view image comprises shifting pixels of each view image along the horizontal direction. For example, the views (v1, v2, v3, v4) have horizontal camera poses in a 4×1 configuration. In other embodiments, the views may have vertical views or have both horizontal and vertical views.

FIG. 6 also shows how all the content assigned to the first multiview image layer 219 is shifted in response to the depth setting 228. Some embodiments involve selecting a region of the first multiview image layer 219 and selectively shifting a portion of the view images that fall within the selected region. For example, a user may select a portion of the first multiview image layer 219 by drawing a box (or any other shape), selecting a particular color, or making any other pixel location selection. Thereafter, the depth setting is applied only to the selected region of the selected multiview image layer. For example, the view images of the first multiview image layer 219 may represent a person having various features (e.g., a body, an arm, a head, etc.). A user may select a feature (or a portion thereof) so that the depth setting is applied only to the pixels of the feature.

Figure 7:
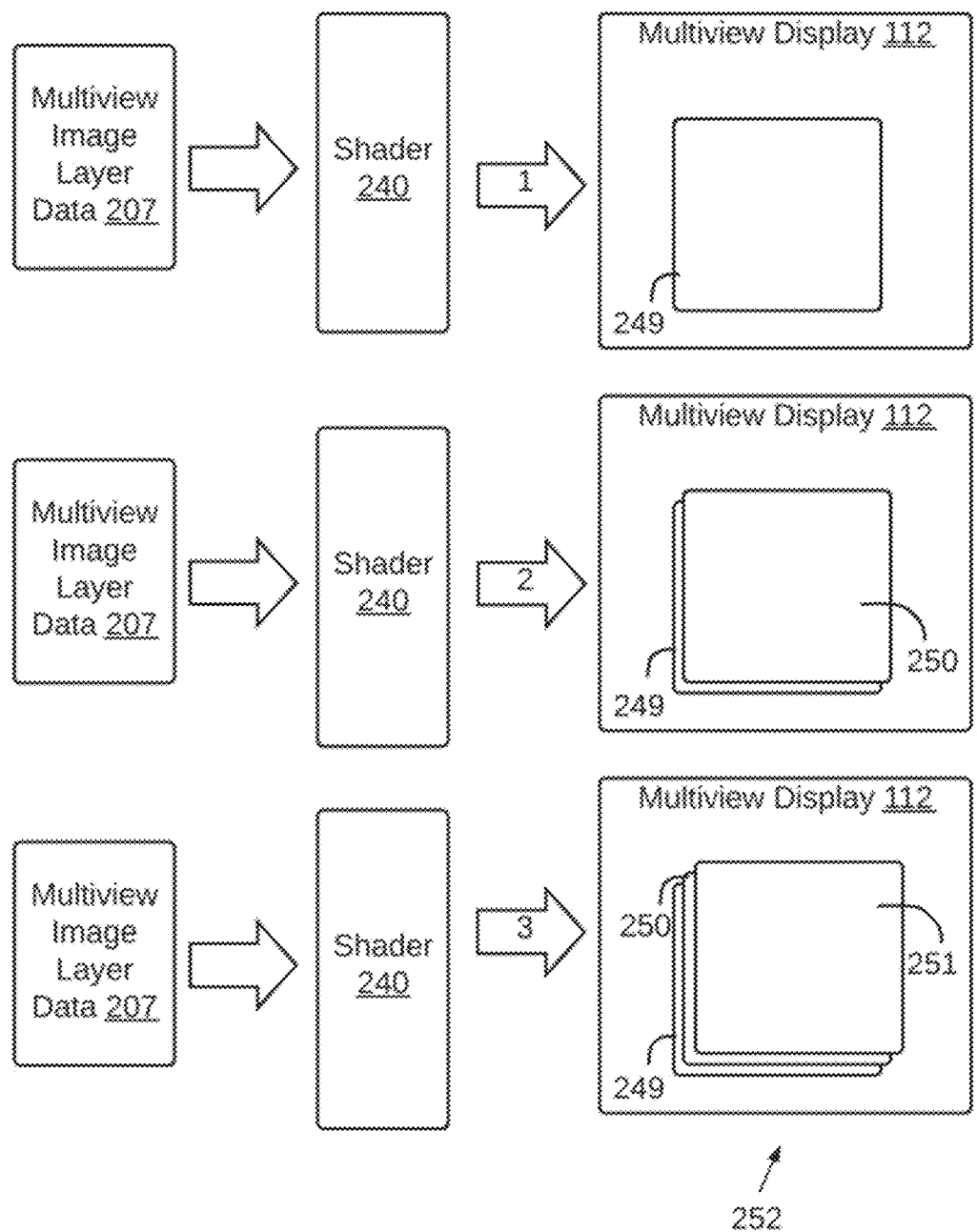
FIG. 7 illustrates an example of automatically rendering a plurality of multiview image layers according to an embodiment consistent with the principles described herein.

FIG. 7 illustrates an example of automatically rendering a plurality of multiview image layers according to an embodiment consistent with the principles described herein. For example, FIG. 7 depicts automatically rendering the plurality of multiview image layers in a predefined sequence as the composite multiview image on a multiview display. In some embodiments, the rendering is automatic such that an application may automatically render the plurality of multiview image layers in response to user input. For example, each time a user draws, edits, or otherwise modifies the graphic content in one or more multiview image layers, the application automatically renders it for display to allow the user to see the results of his or her edits. In some embodiments, the rendering is automatic such that an application may periodically render the multiview image layers to display the most recent edits made to the multiview content. Automatic rendering allows that user to perceive the composite multiview image as changes are made to the depth in real time. The different view images of a multiview image layer are modified (e.g., shifted) automatically as a user adjusts a depth setting.

The multiview image layers are stored as multiview image layer data 207. The application that is renders the multiview image layers may utilize a shader 240 to perform the rendering. A shader 240 may be a module or program executed in a graphics pipeline to process texture data or other image data. A shader 240 may be a hardware component that is part of the GPU or it may be a software program that is executed in the graphics pipeline. The shader 240 may paint each multiview image layer according to a predefined sequence. The predefined sequence may be specified by the user and may be included as part of the multiview image layer data 207. For example, the predefined sequence may be the multiview image layer order 210 set by the user. The predefined sequence may specify a bottom multiview image layer 249, one or more intermediate multiview image layers 250, and a top multiview image layer 251. The shader 240 may begin by painting the bottom multiview image layer 249 on the multiview display 112 in a first sequence (shown as a first arrow). The shader 240 may then paint an intermediate multiview image layer 250 on the multiview display 112. As each multiview image layer is painted onto the multiview display 112, the current multiview image layer may cover or otherwise override the underlying multiview image layer in a second sequence (shown as a second arrow). In this respect, the pixel values of the underlaying multiview image layer is replaced with the pixel values of the current multiview image layer. The shader 240 may then paint the top multiview image layer 251 on the multiview display 112 in a third sequence (shown as a third arrow). This completes the rendering of the multiview image layers 249, 250, 251, which produce a composite multiview image 252 on the multiview display 112. The painting performed by the shader 240 involves mapping pixel values of a particular multiview image layer to corresponding locations on a screen. Painting is a part of rendering images for display. In some embodiments, the shader 240 is configured to paint images to a graphics memory buffer before rendering the images on the display.

In some embodiments, operations to create a multiview image include automatically rendering the plurality of multiview image layers by rendering an upper multiview image layer defined by the predefined sequence while omitting transparent regions of the upper multiview image layer. For example, a multiview image layer may include a transparent channel (in addition to color channels) that specify a level of transparency of each pixel. A transparent region includes one or more pixels having a pixel value indicating that the region is transparent (e.g., completely or partially transparent). When rendering transparent regions of an intermediate multiview image layer 250 a corresponding portion of the bottom multiview image layer 249 will remain exposed in the composite multiview image 252 unless it is covered up by an upper multiview image layer.

In some embodiments, operations to create a multiview image include formatting the composite multiview image 252 in a user-specified multiview file format. A multiview file format may be a format that controls a particular multiview configuration (e.g., the number of views, the orientation of the views). When generating multiview images, the user may first specify characteristics that define the ultimate appearance of the multiview image in terms of the number of views, the orientation of the views, the baseline, etc. These characteristics may conform to one of a plurality of selectable multiview image formats. Upon making the selection, the application may generate the composite multiview image 252 according to the multiview format selection.

In some embodiments, operations to create a multiview image include blending each view image of the first multiview image layer with corresponding view images of a second multiview image layer of the plurality of multiview image layers. For example, multiview image layers may be blended during a sequence of the automatic rendering process. For example, when painting an intermediate multiview image layer 250 (e.g., a second multiview image layer) on a bottom multiview image layer 249 (e.g., a first multiview image layer), the shader 240 may blend pixel values of the different multiview image layers rather than completely overwriting the bottom multiview image layer 249 with pixel values of the intermediate multiview image layer 250. Blending may involve averaging the pixel value of an upper multiview image layer with the pixel value of the painted lower multiview image layer(s). Blending may involve a pixel-by-pixel operation to average or otherwise merge the color values of two pixels. In this respect the multiview image layer that is being painted is blended with the previously painted multiview image layers. Thus, blending may occur during the rendering process.

Figure 8:
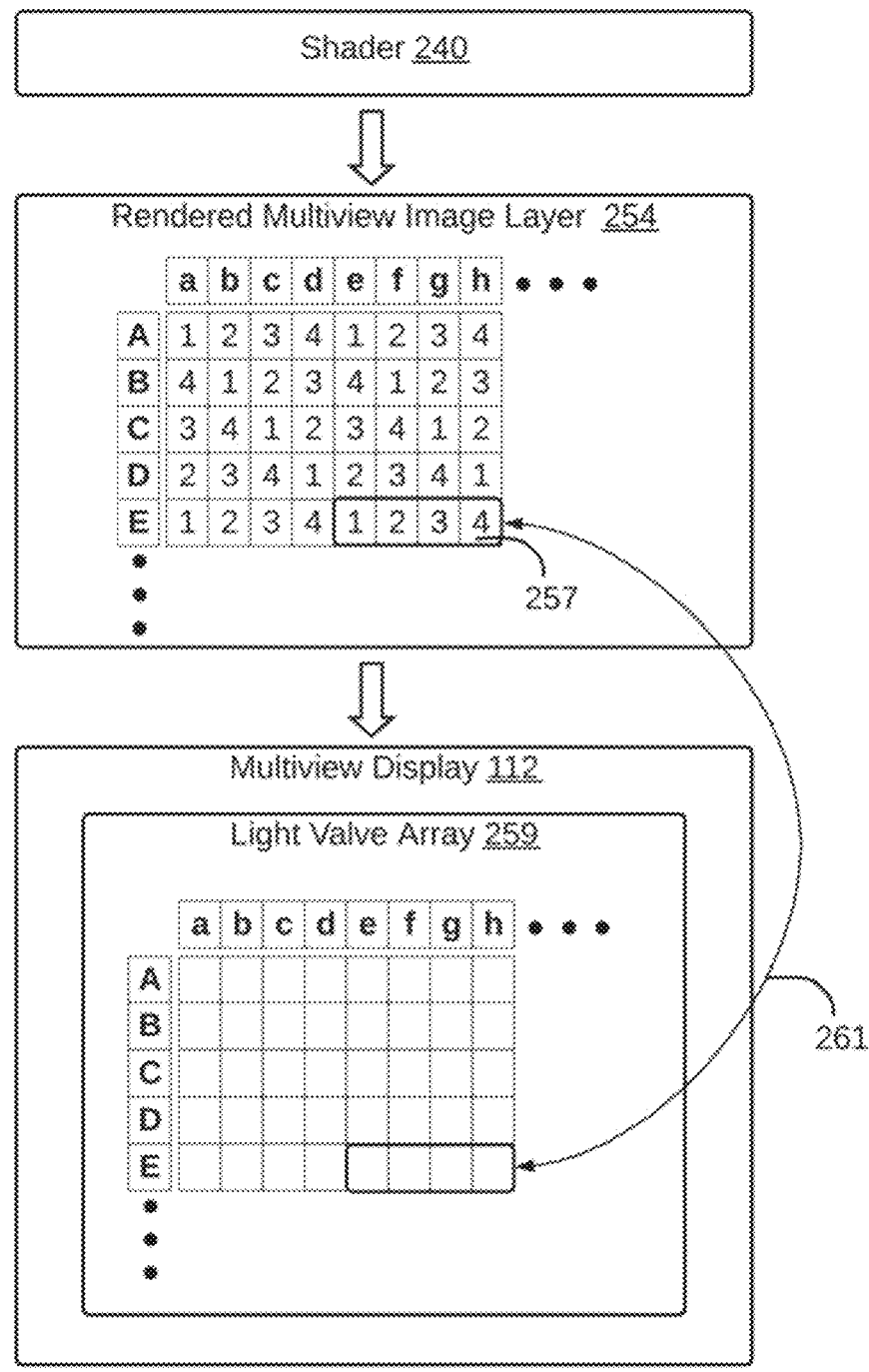
FIG. 8 illustrates an example of a mapping pixels of each view image to interlaced locations of the multiview display according to an embodiment consistent with the principles described herein.

FIG. 8 illustrates an example of a mapping pixels of each view image to interlaced locations of the multiview display according to an embodiment consistent with the principles described herein. For example, in some embodiments, operations to create a multiview image include automatically rendering the plurality of multiview image layers by mapping pixels of each view image to interlaced locations of the multiview display. A shader 240 that performs the rendering may receive multiview image layer data 207 and generate a rendered multiview image layer 254 for each multiview image layer as an output. The rendered multiview image layer 254 may be, for example, the bottom multiview image layer 249, the intermediate multiview image layer(s) 250, or the top multiview image layer 251. The rendered multiview image layer 254 may be loaded into a graphics memory buffer or otherwise painted onto a multiview display 112. The shader 240 may format the rendered multiview image layer 254 according to a format that is specific and native to the multiview display 112. In some embodiments, this involves interlacing pixels of each view to collocate the pixels of various views based on their corresponding locations. For example, the upper left-most pixel of each view may be collocated when generating the rendered multiview image layer 254. In other words, the pixels of each view are spatially multiplexed or otherwise interlaced to generate the rendered multiview image layer 254.

As shown in FIG. 8, the rendered multiview image layer 254 has views that are spatially multiplexed or otherwise interlaced. FIG. 8 shows pixels that correspond to one of four views, where the pixels are interlaced (e.g., interleaved, spatially multiplexed). Pixels belonging to view 1 are represented by the number 1, pixels belonging to view 2 are represented by the number 2, pixels belonging to view 3 are represented by the number 3, and pixels belonging to view 4 are represented by the number 4. The views of the rendered multiview image layer 254 are interlaced on a pixel-basis, horizontally along each row. The rendered multiview image layer 254 has rows of pixels represented by uppercase letters A-E and columns of pixels represents by lowercase letters a-h. FIG. 8 shows the location of one multiview pixel 257 at row E, columns e-h. The multiview pixel 257 is an arrangement of pixels taken from pixels of each of the four views. In other words, the multiview pixel 257 is a result of interlacing the individual pixels of each of the four views so that they are spatially multiplexed. While FIG. 8 shows interlacing the pixels of the different views in the horizontal direction, the pixels of the different views may be interlaced in the vertical direction as well as in both the horizontal and vertical directions.

The interlaced views may result in a multiview pixel 257 having a pixel from each of the four views. In some embodiments, multiview pixels may be staggered in a particular direction, as shown in FIG. 8, where the multiview pixels are aligned horizontally while being staggered vertically. In other embodiments, the multiview pixels may be staggered horizontally and aligned vertically. The particular way multiview pixels are interlaced and staggered may depend on the design of the multiview display 112 and its multiview configuration. The rendered multiview image layer 254 may interlace pixels and arrange its pixels into multiview pixels to allow them to be mapped to the physical pixels (e.g., light valve array 259) of the multiview display 112. In other words, the pixel coordinates of the rendered multiview image layer 254 correspond to physical locations of the multiview display 112. The multiview pixel 257 has a mapping 261 to a specific set of light valves in the light valve array 259. The light valve array 259 is controlled to modulate light according to the rendered multiview image layer 254. Additional multiview image layers are processed by the shader 240 to generate additional rendered multiview image layers that are then painted over underlying rendered multiview image layers.

Figure 9:
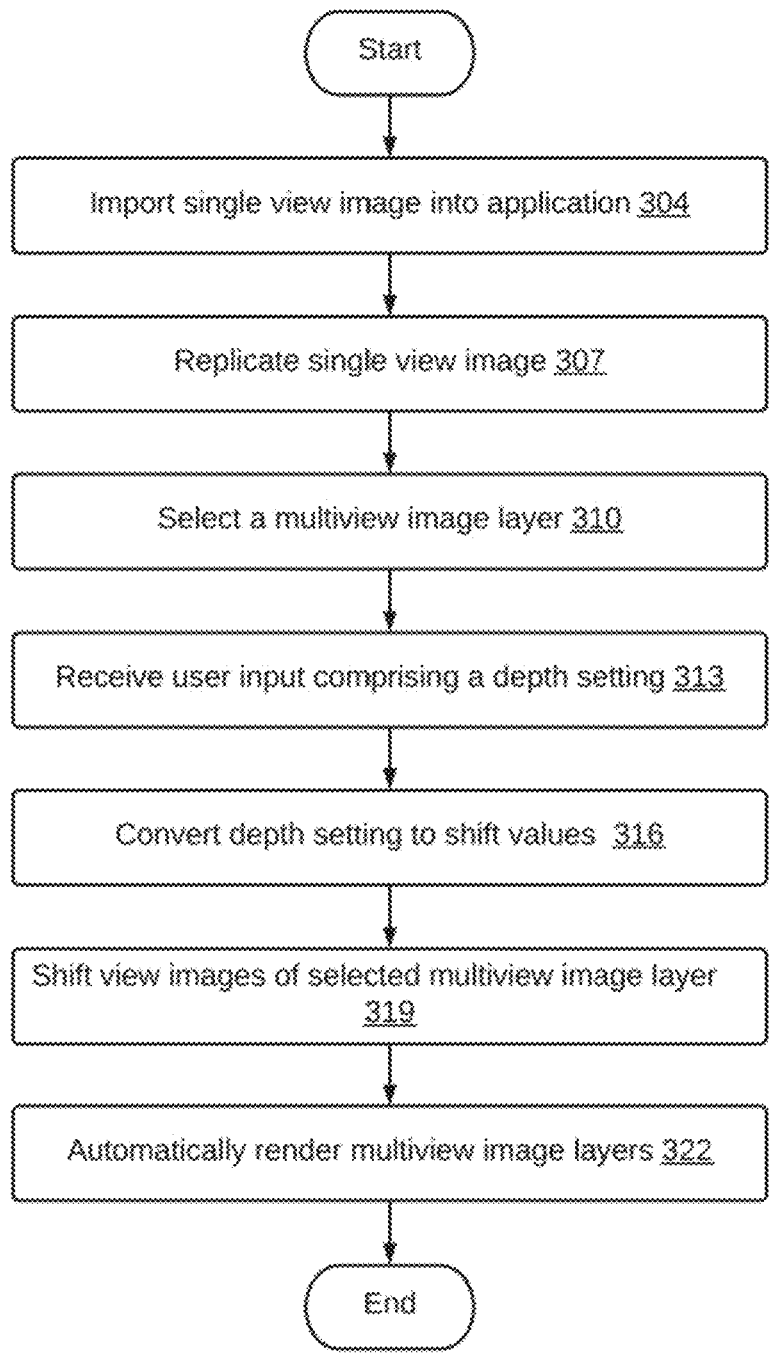
FIG. 9 is a flowchart illustrates a flowchart of a multiview generation system and method of operating the system according to an embodiment consistent with the principles described herein.

FIG. 9 is a flowchart illustrates a flowchart of a multiview image generation system and method of operating the system according to an embodiment consistent with the principles described herein. The flowchart of FIG. 9 provides one example of the different types of functionality implemented by a computing device (e.g., a multiview display system of FIG. 12) executing an instruction set. For example, the multiview image generation system may include a multiview display (e.g., the multiview display 112 of FIGS. 1, 2, 7, and 8). The multiview image generation system may further include a processor and a memory that stores a plurality of instructions, which, when executed, cause the processor to perform various operations shown in the flowchart. As an alternative, the flowchart of FIG. 9 may be viewed as depicting an example of elements of a method implemented in a computing device according to one or more embodiments. FIG. 9 may also represent a nontransitory, computer-readable storage medium storing executable instructions that, when executed by a processor of a computing system, implement operations to create a multiview image.

The multiview image generation system is configured to execute instructions to cause the processor to import 304 a single view image into an application. The multiview image generation system may execute an application (e.g., the application 203 of FIG. 2) that receives or gains access to a single view image. The multiview image generation system is configured to execute instructions to cause the processor to replicate 307 the single view image. A default multiview image format or a user-specified multiview image format may control the number of views or the orientation of the views. The single view image may be replicated according to this multiview image format. For example, as shown in FIG. 3, a single view image 205 is replicated to generate four views having horizontal disparity according to a four-view multiview image format.

The multiview image generation system is configured to execute instructions to cause the processor to select 310 a multiview image layer. For example, the processor may select a first multiview image layer among a plurality of multiview image layers that form a composite multiview image, the first multiview image layer comprising a plurality of view images. The plurality of the view images may be identical view images that are replicated from a single view image that was previously imported. In some embodiments, when importing a single view image, the application may automatically create a new multiview image layer for the single view image layer and then replicate the single view image layer to generate identical views for the new multiview image layer. The new multiview image layer may be selected by default in response to importing the single view image. In other embodiments, the user may manually select any pre-existing multiview image layer. Image editing operations specified by the user are limited to the selected multiview image layer (e.g., the first multiview image layer).

The multiview image generation system is configured to execute instructions to cause the processor to receive 313 user input comprising a depth setting for the first multiview image layer. A depth setting may be a multiview image editing operation to adjust the depth as the multiview image is rendered. The depth setting may be a value that corresponds to the distance that the visual content appears to the user relative to the screen. In this respect, the depth setting can cause content to appear in front of, on, or behind the screen of the multiview display. The depth setting may be applied only to the contents of the selected multiview image layer.

The multiview image generation system is configured to execute instructions to cause the processor to convert 316 the depth setting to shift values. For example, the processor may convert the depth setting to a plurality of shift values for corresponding view images based on an ordered number of each of the view images. For example, the views images may be ordered from 1 to 4 spanning a left-most view to right-most view. The shift value may depend on the relative position of each view image. In some embodiments, one of the view images is assigned as a base view image, wherein the shift value of the base view image is zero. In this respect, view images are shifted relative to the base view image.

The multiview image generation system is configured to execute instructions to cause the processor to shift 319 view images of the selected multiview image layer. For example, the processor may shift the view images of the selected first multiview image layer according to the corresponding shift values. An example of this is discussed above with respect to FIG. 6.

The multiview image generation system is configured to execute instructions to cause the processor to automatically render 322 multiview image layers. For example, the processor may automatically render the plurality of multiview image layers in a predefined sequence as the composite multiview image on the multiview display. An example of this is discussed above with respect to FIG. 7. In addition, the multiview image generation system may include a shader that is a configured to iteratively render the plurality of multiview image layers in the predefined sequence by mapping pixels of each multiview image layer to interlaced locations of the multiview display. In other embodiments, when rendering each multiview image layer in the predefined sequence, a current multiview image layer may be blended during the automatic rendering. In this respect, the processor may blend each view image of the first multiview image layer with corresponding view images of a second multiview image layer of the plurality of multiview image layers.

The flowchart of FIG. 9 discussed above may illustrate a system or method of generating a multiview image and the implementation of an executable instruction set. If embodied in software, each box may represent a module, segment, or portion of code that comprises instructions to implement the specified logical function(s). The instructions may be embodied in the form of source code that comprises human-readable statements written in a programming language, object code that is compiled from source code, or machine code that comprises numerical instructions recognizable by a suitable execution system, such as a processor a computing device. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more boxes may be scrambled relative to the order shown. Also, two or more boxes shown may be executed concurrently or with partial concurrence. Further, in some embodiments, one or more of the boxes may be skipped or omitted.

Figure 10:
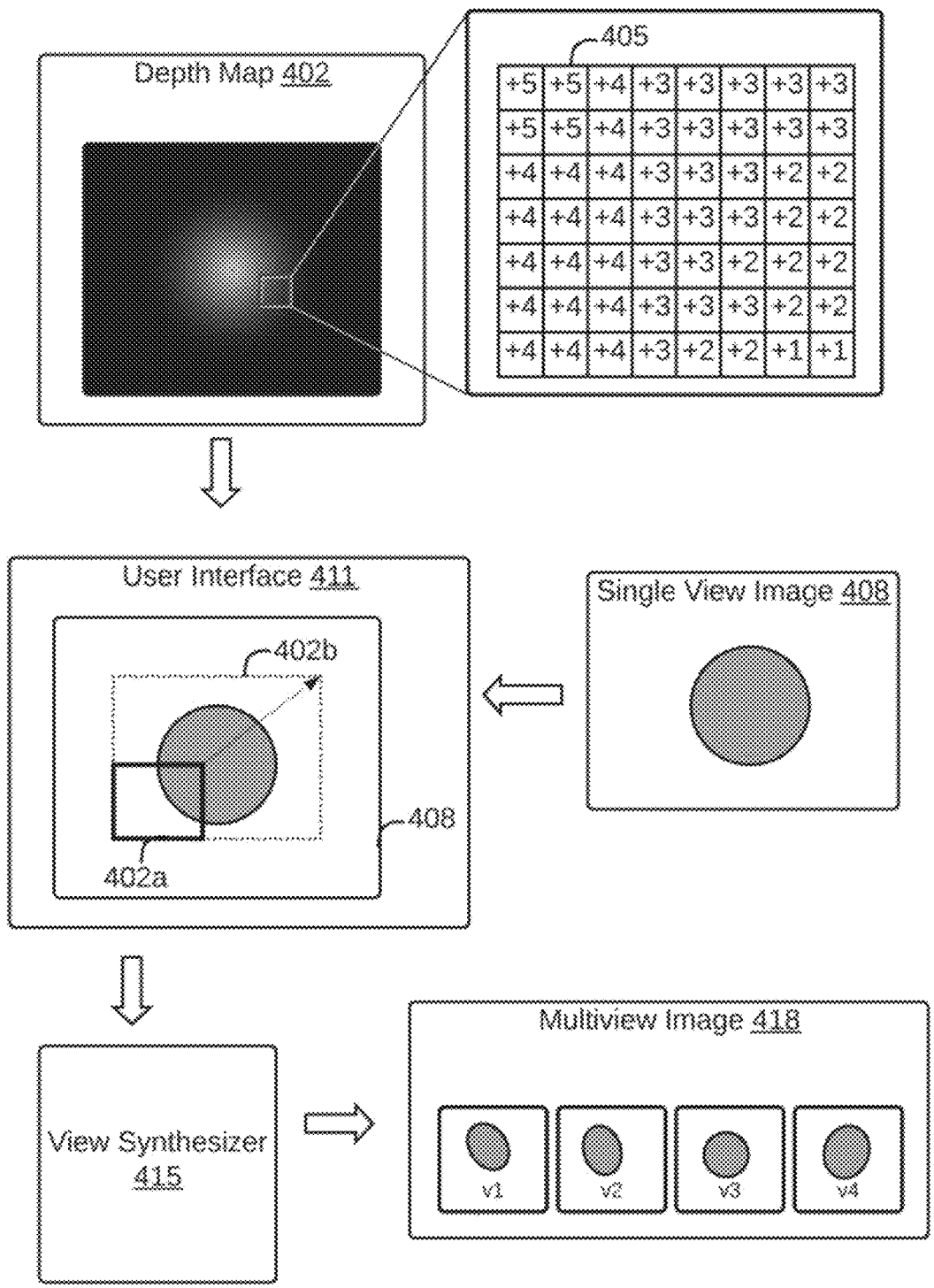
FIG. 10 illustrates an example of creating a multiview image from a depth map according to an embodiment consistent with the principles described herein.

FIG. 10 illustrates an example of creating a multiview image from a depth map according to an embodiment consistent with the principles described herein. FIG. 10 provides one example of the different types of functionality implemented by a computing device (e.g., a multiview display system of FIG. 12) executing an instruction set. FIG. 10 also depicts an embodiment of a non-transitory, computer-readable storage medium storing executable instructions that, when executed by a processor of a computing system, implement operations to create a multiview image using a depth map.

FIG. 10 depicts operations of assigning a single view image to a first multiview image layer. The operations further include loading the depth map for the first multiview image layer. In addition, the operations include modifying one or both of the size and shape of the depth map. The operations further include synthesizing a plurality of view images from the single view image and from the modified depth map for the first multiview image layer; and automatically rendering the first multiview image layer and a second multiview image layer in a predefined sequence as the composite multiview image on a multiview display.

Specifically, FIG. 10 depicts a depth map 402. A depth map may be formatted in an image file or may otherwise include a pixel array. The depth map may include pixel values 405 for each pixel, where the pixel value 405 specifies a depth setting for the pixel. The depth map may be visualized as a grayscale image. The depth map 402 may be applied to a single view image to control the depth of the 2D image on a pixel-by-pixel basis. The example of FIG. 10 depicts a depth map that reflects a spherical shape where pixels towards the center of sphere indicate a positioned that is closer to the viewer while pixels towards the edges of the sphere indicate a position further away from the viewer. The depth map 402 is applied to a single view image 408 so that the single view image 408 adopts the depth properties defined by the depth map 402. The single view image 408 may be presented to a user in a user interface 411. The depth map 402 may be scaled, skewed, resized, reshaped, or otherwise distorted to conform to the edges of objects in the single view image 408. A user may drag various corners or edges of the depth map 402 (or single view image) to align the depth map 402 to the single view image 408. In this respect an initial depth map 402a may be adjusted by a user to generate a modified depth map 402b. The single view image 408 may be assigned to a multiview image layer among a plurality of multiview image layers. A view synthesizer 415 may apply the modified depth map 402b to the single view image 408 to generate view images of a multiview image 418. Thus, view images may be synthesized for selected or specific multiview image layers while preserving the view images of non-selected multiview image layers.

To explain further, the multiview image may be created by assigning a single view image to a first multiview image layer. As discussed above, a user may import a single view image 408 into an application (e.g., the application 203 of FIG. 3). The single view image may be assigned to a multiview image layer by updating multiview image layer data to reflect the assignment. By assigning the single view image to a first multiview image layer, image editing operations performed on the single view image 408 may be limited to just the first multiview image layer without affecting other multiview image layers.

The operations further include loading the depth map 402 for the first multiview image layer. The depth map 402 may be stored as an image file in a repository such as, for example, local memory or a remote server. The depth map 402 may be created by a user be converting an image into a grayscale image. The operations include modifying one or both of the size and shape of the depth map 402. A user may modify the shape or size of the depth map 402 so that an initial depth map 402a results in a modified depth map 402b. A user interface 411 may be configured to overlay the depth map 402 on the single view image 408 and receive user input to modify one or both of the size and shape of the depth map 402. For example, the user may use a cursor, touch screen, or other input mechanism to stretch, skew, enlarge, or shrink the shape and size of the depth map 402. The depth map 402 or single view image 408 may be partially transparent to allow the user to see both the depth map 402 and single view image 408. The user can move, adjust, or modify the depth map 402 to align it or otherwise conform the shape of the depth map 402 to the shape of an object or feature in the single view image 408. The application may allow the user to match the boundaries or edges of features in the depth map 402 to the boundaries or edges of features in the single view image 408. The example of FIG. 10 shows how a spherical feature of the depth map 402 is enlarged and scaled to conform to the spherical feature of the single view image 408 by resizing an initial depth map 402a to be a modified depth map 402b.

Once the depth map 402 is resized or reshaped, operations include synthesizing a plurality of views from single view image 408 and from the modified depth map 402b for the first multiview image layer. A view synthesizer 415 may be used to perform the view synthesis. The view synthesizer 415 may generate a target number of view images from the modified depth map 402b and the single view image 408. The view synthesizer 415 may extrapolate the single view image 408 to generate one or more new view images. View synthesis may involve one or more of forward warping, a depth test, and an in-painting technique to sample nearby regions such as to fill de-occluded regions. Forward warping is an image distortion process that applies a transformation to a source image. Pixels from the source image may be processed in a scanline order and the results are projected onto a target image. A depth test is a process where fragments of an image that are processed or to be processed by a shader have depth values that are tested with respect to a depth of a sample to which it is being written. Fragments are discarded when the test fails. And a depth buffer is updated with the output depth of the fragment when the test passes. In-painting refers to filling in missing or unknown regions of an image. Some techniques involve predicting pixel vales based on nearby pixels or reflecting nearby pixels onto an unknown or missing region. Missing or unknown regions of an image may result from scene de-occlusion, which refers to a scene object that is partially covered by another scene object. In this respect, view synthesis may involve image processing techniques to construct a new perspective of a scene from an original perspective. View synthesis may involve predicting the plurality of view images using a neural network. The neural network may be trained using training data. The training data may include multiview images along with corresponding depth maps.

Once the view images are synthesized, the computing system may perform additional operations including automatically rendering the first multiview image layer and a second multiview image layer in a predefined sequence as the composite multiview image on a multiview display. An example of rendering multiview image layers in a predefined sequence is discussed above with respect to FIG. 7. In some embodiments, the automatic rendering is performed by mapping pixels of each view image to interlaced locations of the multiview display. An example of interlacing pixels of different views of a multiview image layer is discussed above with respect to FIG. 8.

Figure 11:
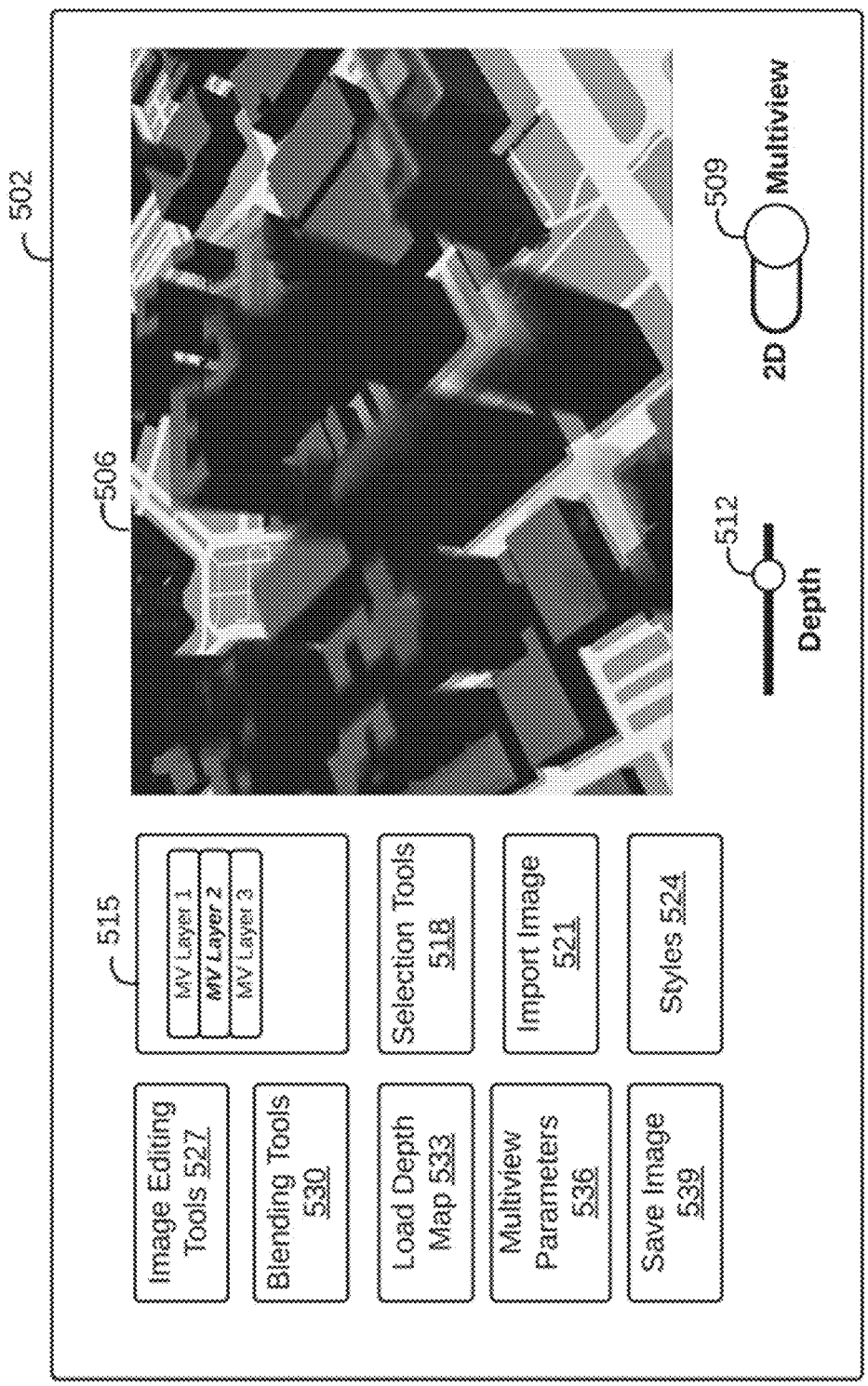
FIG. 11 illustrates an example of a user interface of an application that allows users to create and edit multiview images according to an embodiment consistent with the principles described herein.

FIG. 11 illustrates an example of a user interface of an application that allows users to create and edit multiview images according to an embodiment consistent with the principles described herein. The user interface 502 may be provided by an application such as, for example, the application 203 of FIG. 3. The user interface 502 allows a user to load single view images, convert them to multiview images, layer different multiview images, edit selected layers, adjust multiview parameters of different multiview image layers, and visualize the results on a multiview display in real time as edits are made to the multiview image. The user interface 502 includes an image region 506 which displays an image as it is being edited. The image region 506 presents the image having been processed with the latest edits by the user. In this respect, as a user edits a multiview image, the application automatically renders the multiview image and presents it in the image region 506.

The user interface 502 may also include a 2D/Multiview toggle switch 509. The 2D/Multiview toggle switch 509 allows the user to switch the presentation of the edited image between '2D' and 'multiview.' When the 2D/Multiview toggle switch 509 is set to '2D,' the image region 506 presents the edited image as a 2D image. Editing an image presented in 2D may be more convenient in some instances as it may be easier for the user to select specific portions of the multiview image to perform image editing operations. In addition, the base image view is presented to the user when the '2D' view option is selected. Edits made to the base image view may then be applied to the other views automatically. When the 2D/Multiview toggle switch 509 is set to 'multiview,' the image region 506 presents the edited image as a multiview image.

The user interface 502 may also include a depth controller 512. The depth controller 512 may be similar to the user interface element 225 of FIG. 5 to allow the user to input a depth setting. The depth controller 512 may be used to apply a depth setting to a selected multiview image layer or a selected portion of a selected multiview image layer. For example, as a user modifies the depth settings for a particular multiview image, the multiview image is automatically rendered to allow the user to perceive a depth that tracks to the depth settings.

The user interface 502 may also include a multiview image layer list 515. The multiview image layer list 515 may convey multiview image layer data to the user including an ordered list of multiview image layers. A user may select one or more multiview image layers to apply image editing operations only to the selected multiview image layers. The example, FIG. 11 shows "MV Layer 2" being selected while "MV Layer 1" and "MV Layer 3" are not selected. As a result, image editing operations (e.g., adjusting a depth setting, moving the image, etc.) apply only to the view images of "MV Layer 2." In addition, a user may change the order of the multiview image layers reflected in the multiview image layer list 515. The order may specify the sequence in which the multiview image layers are rendered from bottom to top. In this example, "MV Layer 1" is the name of a bottom multiview image layer, "MV Layer 2" is the name of an intermediate multiview image layer, and "MV Layer 3" is the name of a top multiview image layer.

The user interface 502 may have a menu for selection tools 518. Selection tools 518 may include various user interface elements that allow a user to select pixels shown in the image region 506. For example, a user may use a lasso to select groups of pixels, the user may select pixels corresponding to a color or color range, or the user may select pixels falling within a boundary or edge of a feature of the edited image in the image region 506. Various image editing operations may be applied selectively on the selected pixels.

The user interface 502 may include a menu to import image 521. The menu to import image 521 may provide access to a storage repository of images including single view images. In this respect, a single view image may be imported using the user interface 502. The user interface 502 may include a menu for styles 524. A style 524 is a filter, texture, pattern, or color scheme that transforms the edited image to take on the visual properties of the style 524. Styles 524 may be applied to single view images as a well as multiview images.

The user interface 502 may include image editing tools 527. Image editing tools 527 allow a user to draw shapes, add color fills, erase color, add text or otherwise create visual content. Image editing tools 527 also include to tools to modify the visual properties including sharpening, feathering, blurring, smudging, swirling, mixing pixel color, or creating new images or graphic content. Single view images may be created from a scratch using image editing tools 527 and then converted into a multiview image by modifying the depth.

The user interface 502 may include blending tools 530. Blending refers to blending pixel values of different multiview image layers as the multiview image layers are rendered in a predefined sequence. The blending tools 530 may specify which multiview image layers are blended during rendering as well as any blending function that should apply.

The user interface 502 may include a menu to load depth map 533. For example, the user interface 502 may operate similar to the user interface 411 of FIG. 10 to allow a user to select and load a particular depth map (e.g., the depth map 402 of FIG. 10). The user interface 502 may include a menu for selecting multiview parameters 536. Multiview parameters 536 include parameters that are specific to how to format the multiview image. The multiview parameters 536 may be similar to the multiview parameters 231 of FIG. 5. For example, the multiview parameters 536 may include the baseline, the number of views, or the orientation of the views. The user interface 502 may include a menu to save image 539. The user may specify a multiview file format when saving the image.

The user interface 502 therefore allows the user to create multiview images from single view images and to see the edits made to the multiview image in real time as those edits are made. Rather than creating separate views at different points in time, the user interface may convert a single view image into a multiview image within a selected multiview image layer and allow the user to adjust the depth and other multiview parameters of the multiview image. The creation and editing of different views occur automatically as multiview parameters and image editing operations are applied to a single view image.

FIG. 12 illustrates a schematic block diagram that depicts one example illustration of a multiview display system 1000 according to an embodiment consistent with the principles described herein. The multiview display system 1000 may include a system of components that carry out various computing operations for a user of the multiview display system 1000. The multiview display system 1000 may be a laptop, tablet, smart phone, touch screen system, intelligent display system, computing device, or other client device. The multiview display system 1000 may include various components such as, for example, a processor(s) 1003, a memory 1006, input/output (I/O) component(s) 1009, a display 1012, and potentially other components. These components may couple to a bus 1015 that serves as a local interface to allow the components of the multiview display system 1000 to communicate with each other. While the components of the multiview display system 1000 are shown to be contained within the multiview display system 1000, it should be appreciated that at least some of the components may couple to the multiview display system 1000 through an external connection. For example, components may externally plug into or otherwise connect with the multiview display system 1000 via external ports, sockets, plugs, or connectors.

A processor 1003 may be a central processing unit (CPU), graphics processing unit (GPU), any other integrated circuit that performs computing processing operations, or any combination thereof. The processor(s) 1003 may include one or more processing cores. The processor(s) 1003 comprises circuitry that executes instructions. Instructions include, for example, computer code, programs, logic, or other machine-readable instructions that are received and executed by the processor(s) 1003 to carry out computing functionality that are embodied in the instructions. The processor(s) 1003 may execute instructions to operate on data. For example, the processor(s) 1003 may receive input data (e.g., an image), process the input data according to an instruction set, and generate output data (e.g., a processed image). As another example, the processor(s) 1003 may receive instructions and generate new instructions for subsequent execution. The processor 1003 may comprise the hardware to implement a shader to render images such as the shader 240 discussed above with respect to FIG. 7. The processor(s) 1003 may comprise one or more GPU cores, vector processors, scaler processes, or hardware accelerators that implement a graphics pipeline.

The memory 1006 may include one or more memory components. The memory 1006 is defined herein as including either or both of volatile and nonvolatile memory. Volatile memory components are those that do not retain information upon loss of power. Volatile memory may include, for example, random access memory (RAM), static random access memory (SRAM), dynamic random access memory (DRAM), magnetic random access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1003.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions.

The memory 1006 may refer to the combination of volatile and nonvolatile memory used to store instructions as well as data. For example, data and instructions may be stored in nonvolatile memory and loaded into volatile memory for processing by the processor(s) 1003. The execution of instructions may include, for example, a compiled program that is translated into machine code in a format that can be loaded from nonvolatile memory into volatile memory and then run by the processor 1003, source code that is converted in suitable format such as object code that is capable of being loaded into volatile memory for execution by the processor 1003, or source code that is interpreted by another executable program to generate instructions in volatile memory and executed by the processor 1003, etc. Instructions may be stored or loaded in any portion or component of the memory 1006 including, for example, RAM, ROM, system memory, storage, or any combination thereof.

While the memory 1006 is shown as being separate from other components of the multiview display system 1000, it should be appreciated that the memory 1006 may be embedded or otherwise integrated, at least partially, into one or more components. For example, the processor(s) 1003 may include onboard memory registers or cache to perform processing operations.

I/O component(s) 1009 include, for example, touch screens, speakers, microphones, buttons, switches, dials, camera, sensors, accelerometers, or other components that receive user input or generate output directed to the user. I/O component(s) 1009 may receive user input and convert it into data for storage in the memory 1006 or for processing by the processor(s) 1003. I/O component(s) 1009 may receive data outputted by the memory 1006 or processor(s) 1003 and convert them into a format that is perceived by the user (e.g., sound, tactile responses, visual information, etc.). The user interfaces discussed above may receive user input through an I/O component 1009 such as, for example, a keyboard, touch screen, or mouse, etc.

A specific type of I/O component 1009 is a display 1012. The display 1012 may include a multiview display (e.g., multiview display 112). A capacitive touch screen layer serving as an I/O component 1009 may be layered within the display to allow a user to provide input while contemporaneously perceiving visual output. The processor(s) 1003 may generate data that is formatted as an image for presentation on the display 1012. The processor(s) 1003 may execute instructions to render the image on the display for being perceived by the user.

The bus 1015 facilitates communication of instructions and data between the processor(s) 1003, the memory 1006, the I/O component(s) 1009, the display 1012, and any other components of the multiview display system 1000. The bus 1015 may include address translators, address decoders, fabric, conductive traces, conductive wires, ports, plugs, sockets, and other connectors to allow for the communication of data and instructions.

The instructions within the memory 1006 may be embodied in various forms in a manner that implements at least a portion of the software stack. For example, the instructions may be embodied as an operating system 1031, an application(s) 1034, a device driver (e.g., a display driver 1037), firmware (e.g., display firmware 1040), or other software components. The operating system 1031 is a software platform that supports the basic functions of the multiview display system 1000, such as scheduling tasks, controlling I/O components 1009, providing access to hardware resources, managing power, and supporting applications 1034.

An application(s) 1034 executes on the operating system 1031 and may gain access to hardware resources of the multiview display system 1000 via the operating system 1031. In this respect, the execution of the application(s) 1034 is controlled, at least in part, by the operating system 1031. The application(s) 1034 may be a user-level software program that provides high-level functions, services, and other functionality to the user. In some embodiments, an application 1034 may be a dedicated 'app' downloadable or otherwise accessible to the user on the multiview display system 1000. The user may launch the application(s) 1034 via a user interface provided by the operating system 1031. The application(s) 1034 may be developed by developers and defined in various source code formats. The applications 1034 may be developed using a number of programming or scripting languages such as, for example, C, C++, C#, Objective C, Java®, Swift, JavaScript®, Perl, PHP, Visual Basic®, Python®, Ruby, Go, or other programming languages. The application(s) 1034 may be compiled by a compiler into object code or interpreted by an interpreter for execution by the processor(s) 1003. The application 1034 may be the application 203 of FIG. 3. The application 1034 may also provide a user interface (e.g., user interface 411, user interface 502).

Device drivers such as, for example, the display driver 1037, include instructions that allow the operating system 1031 to communicate with various I/O components 1009. Each I/O component 1009 may have its own device driver. Device drivers may be installed such that they are stored in storage and loaded into system memory. For example, upon installation, a display driver 1037 translates a high-level display instruction received from the operating system 1031 into lower level instructions implemented by the display 1012 to display an image.

Firmware, such as, for example, display firmware 1040, may include machine code or assembly code that allows an I/O component 1009 or display 1012 to perform low-level operations. Firmware may convert electrical signals of particular component into higher level instructions or data. For example, display firmware 1040 may control how a display 1012 activates individual pixels at a low level by adjusting voltage or current signals. Firmware may be stored in nonvolatile memory and executed directly from nonvolatile memory. For example, the display firmware 1040 may be embodied in a ROM chip coupled to the display 1012 such that the ROM chip is separate from other storage and system memory of the multiview display system 1000. The display 1012 may include processing circuitry for executing the display firmware 1040.

The operating system 1031, application(s) 1034, drivers (e.g., display driver 1037), firmware (e.g., display firmware 1040), and potentially other instruction sets may each comprise instructions that are executable by the processor(s) 1003 or other processing circuitry of the multiview display system 1000 to carry out the functionality and operations discussed above. Although the instructions described herein may be embodied in software or code executed by the processor(s) 1003 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments, the instructions that carry out the functionality and operations discussed above may be embodied in a non-transitory, computer-readable storage medium. For example, embodiments are directed to a non-transitory, computer-readable storage medium storing executable instructions that, when executed by a processor (e.g., processor 1003) of a computing system (e.g., the multiview display system 1000) cause the processor to perform various functions discussed above, including operations to generate a multiview image from a single view image. The non-transitory, computer-readable storage medium may or may not be part of the multiview display system 1000. The instructions may include, for example, statements, code, or declarations that can be fetched from the computer-readable medium and executed by processing circuitry (e.g., the processor(s) 1003). Herein, a 'non-transitory, computer-readable storage medium' is defined as any medium that can contain, store, or maintain the instructions described herein for use by or in connection with an instruction execution system, such as, for example, the multiview display system 1000, and further excludes transitory medium including, for example, carrier waves.

The non-transitory, computer-readable medium may comprise any one of many physical media such as, for example, magnetic, optical, or semiconductor media. More specific examples of a suitable non-transitory, computer-readable medium may include, but are not limited to, magnetic tapes, magnetic floppy diskettes, magnetic hard drives, memory cards, solid-state drives, USB flash drives, or optical discs. Also, the non-transitory, computer-readable medium may be a random access memory (RAM) including, for example, static random access memory (SRAM) and dynamic random access memory (DRAM), or magnetic random access memory (MRAM). In addition, the non-transitory, computer-readable medium may be a read-only memory (ROM), a programmable read-only memory (PROM), an erasable programmable read-only memory (EPROM), an electrically erasable programmable read-only memory (EEPROM), or other type of memory device.

The multiview display system 1000 may perform any of the operations or implement the functionality descried above. For example, the flowchart and process flows discussed above may be performed by the multiview display system 1000 that executes instructions and processes data. While the multiview display system 1000 is shown as a single device, embodiments are not so limited. In some embodiments, the multiview display system 1000 may off-load processing of instructions in a distributed manner such that a plurality of multiview display systems 1000 or other computing devices operate together to execute instructions that may be stored or loaded in a distributed arranged. For example, at least some instructions or data may be stored, loaded, or executed in a cloud-based system that operates in conjunction with the multiview display system 1000.

Thus, there have been described examples and embodiments of creating a multiview image, which may be generated from a single view image. An application may replicate the single view image into a plurality of views. A user may adjust the depth which automatically shifts the replicated view images separately based on their relative position. In addition, a user may apply a depth map to a single view and synthesize a plurality of view images from the depth map. The user may modify the shape or size of the depth map to fit it to features of the single view image. Embodiments are directed to a user-level application for creating and editing multiview content from imported single view images. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A method of creating a multiview image, the method comprising:
   importing a single view image into an application, the single view image being assigned to a first multiview image layer among a plurality of multiview image layers that form a composite multiview image;
   replicating the single view image into a plurality of view images of the first multiview image layer;
   receiving user input comprising a depth setting for the first multiview image layer;
   converting the depth setting to a plurality of shift values for corresponding view images based on an ordered number of each of the view images, the plurality of shift values being ordered such that adjacent shift values are equally spaced apart with a spacing that corresponds to the depth setting;
   shifting the view images of the first multiview image layer according to the corresponding shift values in response to the first multiview image layer being selected; and
   automatically rendering the plurality of multiview image layers in a predefined sequence as the composite multiview image on a multiview display.

2. The method of creating a multiview image of claim 1, wherein the single view image is formatted in a bitmap format comprising color channel values and a transparency value for each pixel.

3. The method of creating a multiview image of claim 1, further comprising assigning one of the view images as a base view image, wherein the shift value of the base view image is zero.

4. The method of creating a multiview image of claim 1, wherein shifting each view image comprises shifting pixels of each view image along a horizontal direction.

5. The method of creating a multiview image of claim 1, further comprising blending each view image of the first multiview image layer with corresponding view images of a second multiview image layer of the plurality of multiview image layers.

6. The method of creating a multiview image of claim 1, wherein automatically rendering the plurality of multiview image layers in the predefined sequence as the composite multiview image comprises rendering an upper multiview image layer defined by the predefined sequence while omitting transparent regions of the upper multiview image layer.

7. The method of creating a multiview image of claim 1, wherein automatically rendering the plurality of multiview image layers in the predefined sequence as the composite multiview image comprises mapping pixels of each view image to interlaced locations of the multiview display.

8. The method of creating a multiview image of claim 1, further comprising selecting a region of the first multiview image layer and selectively shifting a portion of the view images that fall within the selected region.

9. The method of creating a multiview image of claim 1, further comprising formatting the composite multiview image in a user-specified multiview file format.

10. A multiview image generation system comprising:
    a multiview display;
    a processor, and
    a memory that stores a plurality of instructions, which, when executed, cause the processor to:
      select a first multiview image layer among a plurality of multiview image layers that form a composite multiview image, the first multiview image layer comprising a plurality of view images;
      receive user input comprising a depth setting for the first multiview image layer;
      convert the depth setting to a plurality of shift values for corresponding view images based on an ordered number of each of the view images, the plurality of shift values being ordered such that adjacent shift values are equally spaced apart with a spacing that corresponds to the depth setting;
      shift the view images of the selected first multiview image layer according to the corresponding shift values; and
      automatically render the plurality of multiview image layers in a predefined sequence as the composite multiview image on the multiview display,
    wherein the first multiview image layer is a newly created multiview image layer, and
    wherein each ordered number corresponds to a relative position of each of the view images.

11. The multiview image generation system of claim 10, wherein the plurality of the view images are identical view images that are replicated from a single view image.

12. The multiview image generation system of claim 10, wherein one of the view images is assigned as a base view image, wherein the shift value of the base view image is zero.

13. The multiview image generation system of claim 10, wherein the plurality of instructions, which, when executed, further cause the processor to:
    blend each view image of the first multiview image layer with corresponding view images of a second multiview image layer of the plurality of multiview image layers.

14. The multiview image generation system of claim 10, further comprising a shader configured to iteratively render the plurality of multiview image layers in the predefined sequence by mapping pixels of each multiview image layer to interlaced locations of the multiview display.

15. The multiview image generation system of claim 10, wherein the multiview display is configured to provide broad-angle emitted light during a two-dimensional (2D) mode using a broad-angle backlight;
   wherein the multiview display is configured to provide directional emitted light during a multiview mode using a multiview backlight having an array of multibeam elements, the directional emitted light comprising a plurality of directional light beams provided by each multibeam element of the multibeam element array;
   wherein the multiview display is configured to time multiplex the 2D and multiview modes using a mode controller to sequentially activate the broad-angle backlight during a first sequential time interval corresponding to the 2D mode and the multiview backlight during a second sequential time interval corresponding to the multiview mode; and
   wherein directions of directional light beams of the directional light beam plurality correspond to different view directions of the composite multiview image.

16. The multiview image generation system of claim 15, wherein the multiview display is configured to guide light in a light guide as guided light; and
   wherein the multiview display is configured to scatter out a portion of the guided light as the directional emitted light using multibeam elements of the multibeam element array, each multibeam element of the multibeam element array comprising one or more of a diffraction grating, a micro-refractive element, and a micro-reflective element.

17. A non-transitory, computer-readable storage medium storing executable instructions that, when executed by a processor of a computing system, implement operations to create a multiview image from a depth map. the operations comprising:
   assigning a single view image to a first multiview image layer;
   loading the depth map for the first multiview image layer;
   modifying one or both of a size and a shape of the depth map to provide a modified depth map;
   synthesizing a plurality of view images from the single view image and from the modified depth map for the first multiview image layer, the plurality of view images being ordered such that adjacent view images are equally spaced apart with a spacing that corresponds to a property of the modified depth map; and
   automatically rendering the first multiview image layer and a second multiview image layer in a predefined sequence as a composite multiview image on a multiview display.

18. The non-transitory, computer-readable storage medium of claim 17, wherein synthesizing a plurality of view images comprises predicting the plurality of view images using a neural network.

19. The non-transitory, computer-readable storage medium of claim 17, wherein automatically rendering comprises mapping pixels of each view image to interlaced locations of the multiview display.

20. The non-transitory, computer-readable storage medium of claim 17, wherein a user interface is configured to overlay the depth map on the single view image and receive user input to modify one or both of a size and a shape of the depth map.

\* \* \* \* \*